(12) United States Patent
Chen

(10) Patent No.: US 12,729,332 B2
(45) Date of Patent: Sep. 8, 2026

(54) STERICALLY HINDERED HYDROFLUOROOLEFINS WITH DIPOLE MOMENT AND THEIR BLENDS WITH STERICALLY HINDERED-OLEFINS AS REFRIGERANTS FOR HIGH TEMPERATURE HEAT PUMPS AND WORKING FLUID FOR ORGANIC RANKINE CYCLES

(71) Applicant: Carbon Ventures, LLC, Beaumont, TX (US)

(72) Inventor: Daniel H. Chen, Beaumont, TX (US)

(73) Assignee: Carbon Ventures, LLC, Beaumont, TX (US)

( * ) Notice: Subject to any disclaimer, the term of this patent is extended or adjusted under 35 U.S.C. 154(b) by 98 days.

(21) Appl. No.: 18/810,146

(22) Filed: Aug. 20, 2024

(65) Prior Publication Data

US 2025/0066654 A1 Feb. 27, 2025

Related U.S. Application Data

(60) Provisional application No. 63/534,457, filed on Aug. 24, 2023.

(51) Int. Cl.

*C09K 5/04* (2006.01)
*F01K 25/10* (2006.01)
*F25B 9/00* (2006.01)

(52) U.S. Cl.

CPC .............. *C09K 5/045* (2013.01); *F01K 25/10* (2013.01); *F25B 9/006* (2013.01); *C09K 2205/126* (2013.01); *C09K 2205/24* (2013.01)

(58) Field of Classification Search

CPC ..................................................... C09K 5/045
See application file for complete search history.

(56) References Cited

U.S. PATENT DOCUMENTS 5,711,895 A * 1/1998 Takigawa ............. C10M 137/08 252/68
5,746,933 A * 5/1998 Ishida ................ C10M 171/008 549/417

(Continued)

FOREIGN PATENT DOCUMENTS

GB 148877 A * 9/1921 ............. C09K 5/042

OTHER PUBLICATIONS

Atia, D. , Farghally, H. , Ahmed, N. and El-Madany, H. (2017) Organic Rankine Cycle Based Geothermal Energy for Power Generation in Egypt. Energy and Power Engineering, 9, 814-828.

(Continued)

*Primary Examiner* — Christopher R Zerphey
(74) *Attorney, Agent, or Firm* — C. Tumey Law Group PLLC

(57) ABSTRACT

A variety of methods and compositions are disclosed, including, in one example, a method that includes compressing a working fluid with a compressor to form a compressed working fluid, wherein the working fluid includes at least one $C_5$ or $C_6$ cis or (Z) hydrofluoroolefins and at least one $C_5$ or $C_6$ cis olefins, condensing the working fluid to form a condensed working fluid, expanding the working fluid to form an expanded working fluid, and heating the working fluid, wherein heat from a heat source is transferred to a heat sink with the working fluid. In embodiments, the compounds and blends are designed for high temperature heat pump (HTHP) and Organic Rankine Cycle (ORC) applications for waste heat recovery and low-grade renewable (e.g., geothermal & flat panel solar) energy utilization.

20 Claims, 8 Drawing Sheets

(56) References Cited

U.S. PATENT DOCUMENTS

| | | | | |
|---|---|---|---|---|
| 8,075,796 | B2 * | 12/2011 | Rao | C09K 5/045 252/68 |
| 9,745,496 | B2 * | 8/2017 | Kontomaris | F25D 17/00 |
| 9,908,828 | B2 * | 3/2018 | Rached | C07C 17/42 |
| 10,669,465 | B2 * | 6/2020 | Rached | C09K 5/048 |
| 10,717,694 | B2 * | 7/2020 | Smith | C09K 5/04 |
| 11,339,106 | B2 * | 5/2022 | Okamoto | C09K 5/04 |

OTHER PUBLICATIONS

Reyhaneh Loni, Omid Mahian, Christos N. Markides, Evangelos Bellos, Willem G. le Roux, Ailbakhsh Kasaeian, Gholamhassan Najafi, Fatemeh Rajaee, A review of solar-driven organic Rankine cycles: Recent challenges and future outlook, Renewable and Sustainable Energy Reviews, 150(2021)111410.

José C. Jiménez-García, Alexis Ruiz, Alejandro Pacheco-Reyes, and Wilfrido Rivera, "A Comprehensive Review of Organic Rankine Cycles," Processes 2023, 11(7), 1982.

* cited by examiner

STERICALLY HINDERED HYDROFLUOROOLEFINS WITH DIPOLE MOMENT AND THEIR BLENDS WITH STERICALLY HINDERED-OLEFINS AS REFRIGERANTS FOR HIGH TEMPERATURE HEAT PUMPS AND WORKING FLUID FOR ORGANIC RANKINE CYCLES

CROSS REFERENCE TO RELATED APPLICATIONS

This application claims the priority of U.S. Provisional Patent Application No. 63/534,457, filed Aug. 24, 2023, which is incorporated by reference in its entirety.

BACKGROUND

Vapor-compression cycles have been used since as early as 1805. Various chemical compounds have been used as refrigerants in these cycles, including various chlorofluorocarbons (CFCs) such as dichlorodifluoromethane. Chlorofluorocarbons can deplete the ozone layer when they rise into the stratosphere and are decomposed by ultraviolet radiation. Alternatives to chlorofluorocarbons may not be optimized for high temperatures and, in addition, may pose occupational and environmental hazards.

High-temperature heat pump (HTHP) cycles are a specific subset of vapor-compression cycle which function by converting residual heat to high-grade heat to be used in industrial processes. High-temperature heat pump cycles represent a key decarbonizing technology as process heating, which usually requires burning of fuel, may be alternatively accomplished by upgrading low-temperature heat (i.e., "heat source") and moving it to high-temperature units (i.e., "heat sink"). Conventional refrigerants are not well suited to the high temperatures of these high-temperature heat pumps as they often have limited temperature ranges, are incompatible with materials used in high-temperature heat pump compressors (e.g., lubricants), are greenhouse gases (e.g., hydrofluorocarbons) and thus have high global warming potential (GWP), or otherwise have other thermodynamic limitations leading to insufficient coefficient of performance (COP).

BRIEF DESCRIPTION OF THE DRAWINGS

These drawings illustrate certain aspects of some of the examples of the present disclosure and should not be used to limit or define the invention.

DETAILED DESCRIPTION

Figure 1:
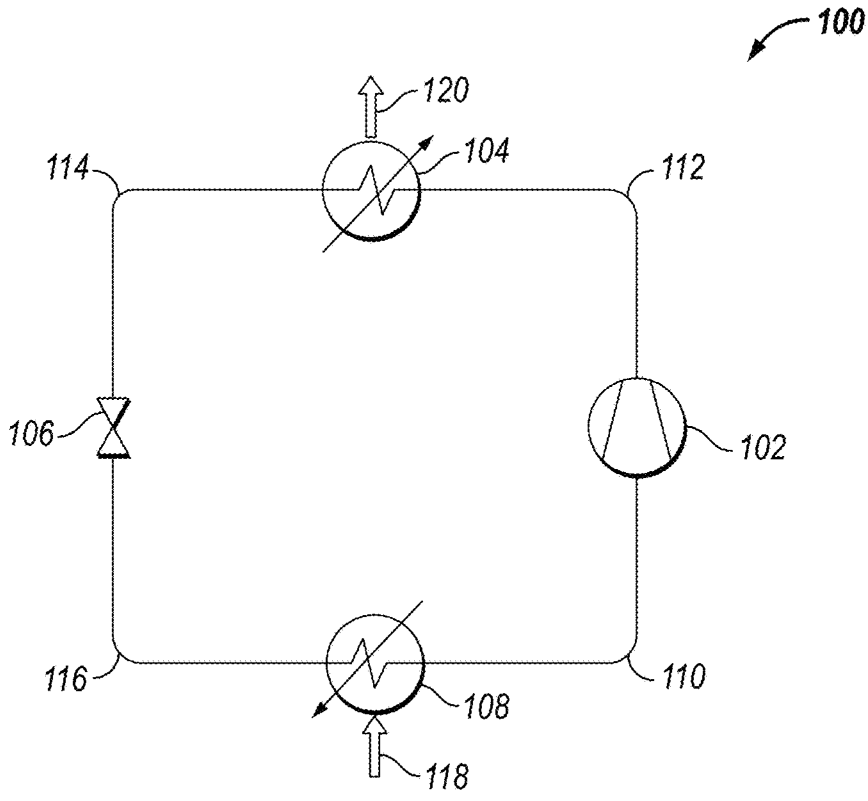
FIG. 1 illustrates a heat pump cycle in accordance with examples of the present disclosure.

It is to be understood that the present disclosure is not limited to particular composition or methods, which may, of course, vary. It is also to be understood that the terminology used herein is for the purpose of describing particular examples only, and is not intended to be limiting. All numbers and ranges disclosed herein may vary by some amount. Whenever a numerical range with a lower limit and an upper limit is disclosed, any number and any included range falling within the range are specifically disclosed. Although individual examples are discussed herein, the invention covers all combinations of all those examples. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Disclosed herein are various vapor-compression cycles using refrigerant as working fluid and, more particularly, disclosed are select refrigerants and their blends including hydrofluoroolefins (HFOs) to be used in various vapor-compression cycles. Advantages of the working fluids of the present disclosure may include improved thermal stability, low toxicity, low flammability, low cost, good compatibility with construction materials, high performance, high latent heat, low compression superheat, low throttling losses, high heat transfer properties, and improved compatibility with the environment.

Even more particularly, the present disclosure relates to $C_5$ and/or $C_6$ hydrofluoroolefins and $C_5$ and/or $C_6$ olefins and their compositions, structures, and material properties, and how they may be used, blended together, and optimized in single-stage or multiple-stage cycles. The $C_5$ and/or $C_6$ hydrofluoroolefins may be sterically hindered on both sides of the double bond. The $C_5$ and/or $C_6$ cis olefins are defined as any $C_5$ and/or $C_6$ cis olefin or its derivatives wherein any of the hydrogen or overcrowded substituent —$CH_3$ groups of the $C_5$ and/or $C_6$ cis olefin may be replaced by any heteroatom group.

Without being limited by theory, it is believed that certain $C_5$ and/or $C_6$ hydrofluoroolefins and $C_5$ and/or $C_6$ cis olefins synergistically work together to exhibit favorable properties when used in certain vapor-compression cycles. The unique combinations of these compounds result in a working fluid which has a low flammability, high critical temperature, low critical pressure, low ozone-depletion potential, low global warming potential, good safety characteristics, thermal stability, as well as compatibility with construction materials, lubricants, and high temperature heat pumps.

Specifically, it is believed that the stereochemistry of $C_5$ and/or $C_6$ cis olefins, which are characterized by their symmetric and overcrowded substituent —$CH_3$ groups or any heteroatom groups, interacts favorably with select $C_5$ and/or $C_6$ hydrofluoroolefins. For example, cis hex-2-ene and especially cis hex-3-ene have the highest critical temperature of the $C_6H_{12}$ with their crowded methyl (—$CH_3$) substituent group attached symmetrically to the double bond. It is believed that refrigerants or working fluids having a critical temperature relatively close to the temperature of the heat source should reach the highest cycle efficiency.

Also, the dipole moment of certain cis or (Z) isomers such as those having polar substituents like —$CF_3$ and —$CH_2CF_3$, may also contribute to the favorable properties of the working fluid due to their higher boiling point, higher critical temperature, and molecular weight. These synergistic properties allow them to be used in high temperature cycles safely, with good efficacy, and with minimal impact to the environment. The $C_5$ and/or $C_6$ cis olefin or cis olefin derivative has a higher boiling temperature and critical temperature due to its more crowded space around the double bond, i.e., the steric effect. The bulkier the substituent to a double bond is, the more pronounced the increase in boiling temperature and the increase in critical temperature will be. A trifluoromethyl group (—$CF_3$) or a trifluoroethyl group (—$CH_2CF_3$) gives the cis isomer a synergistic dipole moment leading to a 16° C. higher boiling point and critical temperature as compared to the same molecules without these polar substituent groups, for example.

The working fluid of the present disclosure includes one or more $C_5$ and/or $C_6$ hydrofluoroolefins and at least one $C_5$ and/or $C_6$ cis or (Z) olefin. Typically, components of the working fluid are selected such that the working fluid presents the favorable properties mentioned above. As will be discussed in greater detail below, suitability of the working fluid for a particular vapor-compression cycle is judged based on critical temperature, critical pressure, anticipated flammability, and safety classifications, as well as their chlorine and bromine content. For example, mixing the $C_5$ and/or $C_6$ hydrofluoroolefins with the $C_5$ and/or $C_6$ cis olefins is guided by raising the critical temperature while staying within the boundary of the A2L (mild flammability, low toxicity, and low global warming potential) or A1 (lowest flammability with no flame propagation, lowest toxicity, and lowest global warming potential).

As mentioned above, the working fluid of the present disclosure includes one or more $C_5$ and/or $C_6$ cis or (Z) hydrofluoroolefins. Suitable $C_5$ hydrofluoroolefins may include (Z)-1,1,1,4,4,4-hexafluoro-2-methyl-2-butene, 2-(difluoromethyl)-1,1,4,4-tetrafluorobut-2-ene, 1,1,1,4,4,4-hexafluoro-2-(trifluoromethyl)-2-butene, (E)-1,1,1,4,4,4-hexafluoro-2-methyl-2-butene, (E)-1,1,1,2,4,4,4-heptafluoro-3-methylbut-2-ene, (Z)-1,1,1,2,4,4,4-heptafluoro-3-methylbut-2-ene, (E)-1,1,1,3,5,5,5-heptafluoro-2-pentene, (Z)-1,1,1,3,5,5,5-heptafluoro-2-pentene, or any combinations thereof, for example. Without being limited by theory, it is believed that both the high molecular weight and steric bulk of these compounds (i.e., as represented by their A-values) contribute to the higher boiling and critical temperatures of the working fluid.

Alternative or additional $C_5$ hydrofluoroolefins to those provided above may include one or more monofluoromethyl-, difluoromethyl-, and/or trifluoromethyl-substituted $C_5$ olefins, for example. A $C_5$ hydrofluoroolefins may be linear or branched. Non-limiting examples of branched $C_5$ olefins which may be substituted with one or more mono, di, or trifluoromethyl groups to form $C_5$ hydrofluoroolefins may include 1-pentene, trans-2-pentene, cis-2-pentene, cis-piperylene, trans-piperylene, 2-methyl-1-butene, 2-methyl-2-butene, isoprene, trans-1,3-pentadiene, cis-1,3-pentadiene, 2-methyl-2-butene, and any combinations thereof.

Example $C_6$ cis or (Z) hydrofluoroolefins may include (Z)-1,1,1,4,4,4-hexafluoro-2,3-dimethyl-2-butene, (Z)-1,1,1-Trifluoro-3-trifluoromethyl-pent-2-ene, (Z)-1,1,4,4-Tetrafluoro-2-methyl-3-difluoromethyl-but-2-ene, (Z)-1,1,1,4,4-Hexafluoro-2-fluoromethyl-3-methyl-but-2-ene, (Z)-1,1,2,4,4,4-Heptafluoro-pent-2-ene, (E)-1,1,1,3,5,5,5-Heptafluoro-2-methyl-pent-2-ene, 1,1,1,4,4,4-Hexafluoro-2-trifluoromethyl-3-methyl-but-2-ene, (Z)-1,1,4,4-Tetrafluoro-2,3-dimethyl-but-2-ene.

Alternative or additional $C_6$ cis or (Z) hydrofluoroolefins to those provided above may include, for example, one or more monofluoromethyl-, difluoromethyl-, and/or trifluoromethyl-substituted $C_6$ olefins. A $C_6$ hydrofluoroolefins may be linear or branched. Non-limiting examples of branched $C_6$ olefins which may be substituted with one or more mono, di, or trifluoromethyl groups to form $C_6$ hydrofluoroolefins may include cis-2-hexene, 2-methyl-1-pentene, 2-methyl-2-pentene, and any combinations thereof.

As mentioned above, the working fluids of the present disclosure may include at least one $C_5$ and/or $C_6$ cis olefin. The cis olefins of this disclosure may not be well suited as stand-alone refrigerants or working fluids due to their high flammability. However, as alluded to previously, certain hydrofluoroolefins may serve to temper the high flammability of these cis olefins while imparting favorable properties to the working fluids and exhibiting synergy with the cis olefins. For example, mixing select $C_5$ hydrofluoroolefins with select cis olefins allows for a higher critical temperature while staying within an A1 or A2L classification. Examples of cis olefins according to the present disclosure include 2-methyl-2-butene, 2,3-dimethyl-2 butene, or both.

The $C_5$ and/or $C_6$ cis or (Z) olefins and $C_5$ and/or $C_6$ hydrofluoroolefins of the present disclosure may be enantiomerically pure or essentially enantiomerically pure. In some examples, the $C_5$ and/or $C_6$ cis olefins and $C_5$ and/or $C_6$ hydrofluoroolefins may be diastereomerically pure or essentially diastereomerically pure. In some examples, the $C_5$ and/or $C_6$ cis olefins and $C_5$ and/or $C_6$ hydrofluoroolefins may be free or essentially free of trans-olefins. As used herein, the terms "essentially pure" and "essentially free of" refer to a composition with only negligible or trace amounts of the impurities, e.g., in an amount less than about 0.1 wt. %, less than about 0.01 wt. %, or less than about 0.001 wt. %.

Table 1 is a reference table showing example $C_5$ cis or (Z) hydrofluoroolefins and cis olefins, as well as corresponding data, in accordance with some examples of the present disclosure. The data includes critical temperatures, critical pressures, global warming potential (GWP), ozone depletion potential (ODP), Norm Π, and safety classification (SC).

The ozone depletion potential (ODP) is determined based on the amount of chlorine or bromine present in the compound.

The safety classification is a safety classification for refrigerants or working fluids provided by the American Society of Heating, Refrigerating and Air-Conditioning Engineers (ASHRAE) according to toxicity (A and B) and flammability (1, 2, and 3) classes.

The normalized flammability index (Norm. Π or $\Pi_{norm}$) ranges from −100 to +100. $\Pi_{norm}$=0 represents the 1/2L boundary and $\Pi_{norm}$=100 estimates high flammability. The boundary between 2/2L is taken as $\Pi_{norm}$=40. Negative values represent class 1 (nonflammable). Example working fluids may have a high fluorine content, i.e., fluorine to (fluorine+hydrogen) ratio or F/(F+H), to make the working fluid less flammable. For all refrigerants ranging from alkanes/alkenes to fully fluorinated alkanes/alkenes, F/(F+H) can range from 0 to 1. For hydrofluoroolefins, the ratio above 0.66, a ratio above 0.7, a ratio above 0.8, or a ratio above 0.9 may be considered high.

Olefins (OLE) A and B (or OLE A & B), shown in Table 1A, may be produced from fractionation of petroleum or dehydrogenation of a corresponding alkane. Examples of $C_6$ hydrofluoroolefins include name and chemical structure are given in Table 1B.

TABLE 1A

Example C5 Hydrofluoroolefins and Cis Olefins

| Compound | Chemical Formula | Name | Tc, ° C. | Pc, bar | GWP | ODP | Norm. Π | SC |
|---|---|---|---|---|---|---|---|---|
| HFO A | C5H4F6 | (Z)-1,1,1,4,4,4-hexafluoro-2-methylbut-2-ene | 199 | 28.5 | <10 | ~0 | 7 | A2L |
| HFO B | C5H4F6 | 2-(difluoromethyl)-1,1,4,4-tetrafluorobut-2-ene | 177 | 28.1 | <10 | ~0 | 7 | A2L |
| HFO C | C5HF9 | 1,1,1,4,4,4-hexafluoro-2-(trifluoromethyl)-2-butene | 162 | 25.3 | <10 | ~0 | −42 | A1 |
| HFO D | C4H2F6 | (Z)-1,1,1,4,4,4-Hexafluoro-2-butene | 171 | 29.0 | 9 | ~0 | −23 | A1 |
| HFO E | C5H3F7 | (E)-1,1,1,2,4,4,4-heptafluoro-3-methyl-2-butene | 192 | 28 | <10 | ~0 | −10 | A1 |
| HFO F | C5H3F7 | (Z)-1,1,1,2,4,4,4-heptafluoro-3-methyl-2-butene | 182 | 28 | <10 | ~0 | −10 | A1 |
| HFO G | C5H3F7 | (E)-1,1,1,3,5,5,5-heptafluoro-3-methyl-2-butene | 193 | 28 | <10 | ~0 | −10 | A1 |
| HFO H | C5H3F7 | (Z)-1,1,1,3,5,5,5-heptafluoro-3-methyl-2-butene | 179 | 28 | <10 | ~0 | −10 | A1 |
| HFO I | C5H4F6 | (E)-1,1,1,4,4,4-hexafluoro-2-methylbut-2-ene | 181 | 28.5 | <10 | ~0 | 7 | A2L |
| Olefin A | C5H10 | 2-methyl-2-butene | 197 | 34.5 | 0 | 0 | 100 | A3 |
| Olefin B | C6H12 | 2,3-dimethyl-2-butene | 251 | 33.6 | 0 | 0 | 100 | A3 |

TABLE 1B

Examples of C6 Cis or (Z) Hydrofluoroolefins (HFOs)

| Compound | Chemical Formula | Name | Chemical Structure |
|---|---|---|---|
| HFOC6 A | C6H6F6 | (Z)-1,1,1,4,4,4-Hexafluoro-2,3-dimethyl-but-2-ene | CF3—C(CH3)═C(CH3)—CF3 |
| HFOC6 B | C6H6F6 | (Z)-1,1,1-Trifluoro-3-trifluoromethyl-pent-2-ene | CF3—CH═C(CF3)—C2H5 |
| HFOC6 C | C6H6F6 | (Z)-1,1,4,4-Tetrafluoro-2-methyl-3-difluoromethyl-but-2-ene | CHF2—C(CH3)═C(CHF2)—CHF2 |
| HFOC6 D | C6H5F7 | (Z)-1,1,1,4,4,4-Hexafluoro-2-fluoromethyl-3-methyl-but-2-ene | CF3—C(CH2F)═C(CH3)—CF3 |
| HFOC6 E | C6H5F7 | (Z)-1,1,1,2,4,4,4-Heptafluoro-pent-2-ene | CF3CF═C(CF3)—C2H5 |
| HFOC6 F | C6H5F7 | (E)-1,1,1,3,5,5,5-Heptafluoro-2-methyl-pent-2-ene | CF3—C(CH3)═CF(CH2)—CF3 |
| HFOC6 G | C6H3F9 | 1,1,1,4,4,4-Hexafluoro-2-trifluoromethyl-3-methyl-but-2-ene | CF3—C(CF3)═C(CH3)—CF3 |
| HFOC6 H | C6H8F4 | (Z)-1,1,4,4-Tetrafluoro-2,3-dimethyl-but-2-ene | CHF2—C(CH3)═C(CH3)—CHF2 |

Tables 2A-2D show various refrigerants listed in Table 1A as well as the predicted properties of each working fluid. The working fluid may comprise any of the working fluids shown in Tables 2A-2D. While certain amounts of each compound are shown in Tables 2A-2D, it should be understood that the working fluid of the present disclosure may comprise any of the disclosed compounds in any amount, including any mixtures or combinations thereof. Table 2A gives mole fractions and properties for the pure components and the blends from mixing HFO D or C with Olefin A or B (OLE A or OLE B) to make nonflammable (A1) working fluids. Similarly, Table 2B gives mole fractions and properties for the pure components and the blends from mixing HFO D or C with OLE A or B to make mildly flammable (A2L) working fluids. Table 2C gives mole fractions and properties for the pure components and the blends from mixing HFO A or B with HFO D or C to make nonflammable (A1) working fluids. Table 2D gives mole fractions and properties for the pure components and the blends from mixing HFO A or B with OLE A or B to make mildly flammable (A2L) working fluids.

Table 2E gives mole fractions and properties for the pure components and the blends from mixing HFO E or G with OLE A or B to make nonflammable (A1) working fluids.

TABLE 2A

HFO D or C Blend with OLE A or B to Make Nonflammable (A1) Working Fluids

| | Mole Fraction | | | | Properties | | | | | | | |
|---|---|---|---|---|---|---|---|---|---|---|---|---|
| Refrigerant | HFO D | HFO C | OLE A | OLE B | MW | Tb, K | Tc, K | Pc, bar | GWP100 | ODP | Norm. P | SC |
| C4H2F6, HFO D | 1 | | | | 164 | 306 | 445 | 28.95 | 2 | 0 | −21 | A1 |
| C5HF9, HFO C | | 1 | | | 232 | 302 | 436 | 25.3 | <5 | 0 | −40 | A1 |
| C5H10, OLE A | | | 1 | | 70 | 312 | 470 | 34.5 | 0 | 0 | 100 | A3 |
| C6H12, OLE B | | | | 1 | 84 | 346 | 524 | 33.6 | 0 | 0 | 100 | A3 |
| C4.1H2.8F5.4, I | .9 | | .1 | | 155 | 307 | 447 | 30 | 1.8 | 0 | −9 | A1 |
| C4.2H3F5.4, II | .9 | | | .1 | 156 | 310 | 452 | 29 | 1.8 | 0 | −9 | A1 |
| C5H3.25F6.75, III | | .75 | .25 | | 192 | 304 | 444 | 28 | <4 | 0 | −5 | A1 |
| C5.25H3.75F6.75, IV | | .75 | | .25 | 195 | 313 | 458 | 27 | <4 | 0 | −5 | A1 |

TABLE 2B

HFO D & C Blend with OLE A & B to Make Mildly Flammable (A2L) Working Fluids

| | Mole Fraction | | | | Properties | | | | | | | |
|---|---|---|---|---|---|---|---|---|---|---|---|---|
| Refrigerant | HFO D | HFO C | OLE A | OLE B | MW | Tb, K | Tc, K | Pc, bar | GWP100 | ODP | Norm. P | SC |
| C4H2F6, HFO D | 1 | | | | 164 | 306 | 445 | 29.0 | 2 | 0 | −21 | A1 |
| C5HF9, HFO C | | 1 | | | 232 | 302 | 436 | 25.3 | <5 | 0 | −40 | A1 |
| C5H10, OLE A | | | 1 | | 70 | 312 | 470 | 34.5 | 0 | 0 | 100 | A3 |
| C6H12, OLE B | | | | 1 | 84 | 346 | 524 | 33.6 | 0 | 0 | 100 | A3 |
| C4.5H6F3, V | .5 | | 5 | | 117 | 309 | 457 | 32 | 1 | 0 | 40 | A2L |
| C5H7F3, VI | .5 | | | .5 | 124 | 326 | 484 | 31 | 1 | 0 | 40 | A2L |
| C5H5.95F4.05, VII | | .45 | .55 | | 143 | 307 | 454 | 30 | <3 | 0 | 37 | A2L |
| C5.55H7.05F4.05, VIII | | .45 | | .55 | 151 | 326 | 484 | 30 | <3 | 0 | 37 | A2L |

TABLE 2C

HFO A & B Blend with HFO D & C to Make Nonflammable (A1) Working Fluids

| | Mole Fraction | | | | Properties | | | | | | | |
|---|---|---|---|---|---|---|---|---|---|---|---|---|
| Refrigerant | HFO A | HFO B | HFO D | HFO C | MW | Tb, K | Tc, K | Pc, bar | GWP100 | ODP | Norm. Π | SC |
| C5H4F6, HFO A | 1 | | | | 178 | 329 | 472 | 28.5 | <10 | 0 | 7 | A2L |
| C5H4F6, HFO B | | 1 | | | 178 | 317 | 450 | 28.1 | <10 | 0 | 7 | A2L |
| C4H2F6, HFO D | | | 1 | | 164 | 306 | 445 | 29.0 | 2 | 0 | −23 | A1 |
| C5HF9, HFO C | | | | 1 | 232 | 302 | 436 | 25.3 | <5 | 0 | −42 | A1 |
| C4.75H3.5F6, IX | .75 | | .25 | | 175 | 323 | 465 | 28.6 | <8 | 0 | 0 | A1 |
| C5H3.25F6.75, X | .75 | | | .25 | 192 | 322 | 463 | 27.7 | <8 | 0 | −5 | A1 |
| C4.75H3.5F6, XI | | .75 | .25 | | 175 | 314 | 449 | 27.4 | <8 | 0 | 0 | A1 |
| C5H3.25F6.75, XII | | .75 | | .25 | 192 | 313 | 446 | 27.4 | <8 | 0 | −5 | A1 |

TABLE 2D

HFO A & B Blend with OLE A & B to Make Mildly-Flammable (A2L) Working Fluids

| | Mole Fraction | | | | Properties | | | | | | | |
|---|---|---|---|---|---|---|---|---|---|---|---|---|
| Refrigerant | HFO A | HFO B | OLE A | OLE B | MW | Tb, K | Tc, K | Pc, bar | GWP100 | Norm. P | ODP | SC |
| C5H4F6, HFO A | 1 | | | | 178 | 329 | 472 | 28.5 | <10 | 7 | 0 | A2L |
| C5H4F6, HFO B | | 1 | | | 178 | 317 | 450 | 28.1 | <10 | 7 | 0 | A2L |
| C5H10, OLE A | | | 1 | | 70 | 312 | 470 | 34.5 | 0 | 100 | 0 | A3 |
| C6H12, OLE B | | | | 1 | 84 | 346 | 524 | 33.6 | 0 | 100 | 0 | A3 |
| C5H6F4, XIII | .6667 | | .3333 | | 142 | 323 | 471 | 30.5 | <7 | 38 | 0 | A2L |
| C5.33H6.67F4, XIV | .6667 | | | .3333 | 147 | 335 | 489 | 30.2 | <7 | 38 | 0 | A2L |
| C5H6F4, XV | | .6667 | .3333 | | 142 | 315 | 457 | 30.2 | <7 | 38 | 0 | A2L |
| C5.33H6.67F4, XVI | | .6667 | | .3333 | 147 | 327 | 475 | 29.9 | <7 | 38 | 0 | A2L |

TABLE 2E

HFO E & G Blend with OLE A & B to Make Nonflammable (A1) Working Fluids

| | Mole Fraction | | | | Properties | | | | | | | |
|---|---|---|---|---|---|---|---|---|---|---|---|---|
| Refrigerant | C5H3F7, E | C5H3F7, G | C5H10, A | C6H12, B | MW | Tb, K | Tc, K | Pc, bar | GWP100 | Norm. P | ODP | SC |
| C5H3F7, HFO E | 1 | | | | 196 | 324.0 | 465 | 28 | <10 | −10 | 0 | A1 |
| C5H3F7, HFO G | | 1 | | | 196 | 329.0 | 466 | 28.5 | <10 | −10 | 0 | A1 |
| C5H10, OLE A | | | 1 | | 70 | 311.7 | 470 | 34.5 | 0 | 100 | 0 | A3 |
| C6H12, OLE B | | | | 1 | 84 | 346.4 | 524 | 33.6 | 0 | 100 | 0 | A3 |
| C5H3.56F6.44, XVII | .92 | | .08 | | 186 | 323 | 465 | 28 | <8 | −1 | 0 | A1 |
| C5.08H3.72F6.44, XVIII | .92 | | | .08 | 187 | 326 | 470 | 28 | <8 | −1 | 0 | A1 |
| C5H3.56F6.44, XIX | | .92 | .08 | | 186 | 328 | 466 | 29 | <8 | −1 | 0 | A1 |
| C5.08H3.72F6.44, XX | | .92 | | .08 | 187 | 330 | 471 | 29 | <8 | −1 | 0 | A1 |

In one or more examples, any $C_5$ and/or $C_6$ cis olefin or any derivatives or combination thereof, may be individually or collectively present in a working fluid in an amount from about 0.001 wt. % to about 100 wt. %. Alternatively, from about 0.001 wt. % to about 5 wt. %, about 5 wt. % to about 15 wt. %, about 15 wt. % to about 25 wt. %, about 25 wt. % to about 40 wt. %, about 40 wt. % to about 65 wt. %, about 65 wt. % to about 80 wt. %, about 80 wt. % to about 90 wt. %, about 90 wt. % to about 95 wt. %, about 95 wt. % to about 99 wt. %, or any ranges therebetween.

In one or more examples, any $C_5$ and/or $C_6$ cis or (Z) hydrofluoroolefin (HFO) or any derivatives or combination thereof, may be individually or collectively present in a working fluid in an amount from about 0.001 wt. % to about 100 wt. %. Alternatively, from about 0.001 wt. % to about 5 wt. %, about 5 wt. % to about 15 wt. %, about 15 wt. % to about 25 wt. %, about 25 wt. % to about 40 wt. %, about 40 wt. % to about 65 wt. %, about 65 wt. % to about 80 wt. %, about 80 wt. % to about 90 wt. %, about 90 wt. % to about 95 wt. %, about 95 wt. % to about 99 wt. %, or any ranges therebetween.

The $C_5$ cis or (Z) hydrofluoroolefin may be selected from the group comprising HFO A, HFO B, HFO C, HFO E, HFO F, HFO G, HFO H, HFO I, or any derivatives or combination thereof, for example. In some examples, Olefin A and/or Olefin B may be combined with any $C_5$ hydrofluoroolefin (HFO) selected from the group consisting of HFO A, HFO B, HFO C, HFO D, HFO E, HFO F, HFO G, HFO H, HFO I, and any combination thereof. Mole fractions of one or more components of the working fluid may be adjusted to suit a particular application.

The working fluid disclosed herein may be used in various refrigeration cycles as well as heat pump cycles including high temperature heat pump cycles. Carnot efficiency of a high temperature heat pump cycle may be improved by up to 6% by virtue of employing a higher temperature sink (e.g., 199° C.) while maintaining low flammability and little to no ozone depletion potential or global warming potential. In addition, the higher sink temperatures may meet various process heating needs in the range of about 150° C. to about 200° C., such as processes in the food, paper, metal, and chemical industries, etc., to use non-limiting examples.

The working fluid disclosed herein may be used to upgrade low-grade waste heat (<100° C.) to a higher temperature (100-200° C.) to be used in a Steam Rankine Cycle (SRC) or an Organic Rankine cycle (ORC) to generate power, for example. The Rankine cycles are vapor/liquid 2-phase cycles as opposed to the Brayton cycles that are single-phase gas cycles. The low temperature heat sources may include geothermal heat, solar thermal energy, biomass thermal energy, waste heat from power plants such as any industrial exhaust gases, or any combination thereof.

The organic Rankine cycle is effective at recovering heat from low-temperature sources and may be applied at smaller scales compared to water/steam Rankine cycle systems. In embodiments, the organic Rankine cycle uses a high-molecular weight organic compound compared to water as the working fluid for steam Rankine cycle. In embodiments, the high-molecular weight organic compound may be a hydrocarbon (HC), a hydrofluorocarbon (HFC), a hydrofluoroolefin (HFO), or any combination thereof. The high-molecular weight organic compound of the present disclosure acts as organic heat carrier. The high-molecular weight organic compound of the present disclosure has a lower boiling point and a lower vapor pressure compared to water. Therefore, the high-molecular weight organic compound of the present disclosure is better able to vaporize at low temperatures to run the turbines. The higher the molecular weight of the organic compound of the present disclosure and/or the higher its vapor density, the more energy (work) can be transmitted to the generator at the same turbine rotation speed. The high-molecular weight organic compounds of the present disclosure with their higher critical temperatures will give increased efficiency and also lead to higher expansion ratios.

In geothermal applications, binary organic Rankine cycle plants may use the low-temperature heat from the low temperature geothermal fluid to heat up and vaporize a secondary organic fluid, i.e., the high-molecular weight organic compound of the present disclosure, that drives a turbine that generates electric power, for example. Thus, the original heat source fluid remains within a closed loop of piping without passing through the turbine without any harmful emissions into the atmosphere. The heat that is not converted into electricity can be delivered to a thermal user. The low-temperature organic Rankine cycle systems may use the hydrofluoroolefins (HFOs) disclosed above as working fluid, which have zero global warming potential (GWP), zero Ozone Depletion Potential (ODP), and low flammability (A1/A2L). Therefore, the disclosed new refrigerants of the present disclosure can also serve as the working fluid in an organic Rankine cycle power cycle operated at medium temperatures (e.g., turbine inlet from about 120° C. to about 190° C.).

The working fluid may be azeotropic or non-azeotropic. The working fluid may have a boiling point from about 28° C. to about 75° C., or any ranges therebetween. The working fluid may have an average critical temperature between about 160° C. and about 255° C., or any ranges therebetween. The working fluid may have an average critical pressure from about 25 bar to about 35 bar, or any ranges therebetween. Concentrations of the various components, which may be present in the working fluid, may be adjusted to suit a particular application. Concentrations of the components may be modified to adjust any of boiling point, critical temperature, critical pressure, molecular weight, global warming potential (GWP), Ozone Depletion Potential (ODP), and/or Safety Classification as mentioned above.

The working fluid may have an American Society of Heating, Refrigerating, and Air-Conditioning Engineers (ASHRAE) toxicity rating of A. In addition, the working fluid may have an ASHRAE flammability rating of 1, 2L, or 2. The working fluid may have an ASHRAE safety classification of A1, A2L or A2. The working fluid may also have an Ozone Depletion Potential rating of 0 or about 0. The working fluid may have a global warming potential of 0 or about 0. The working fluid may have a total equivalent warming impact (TEWI) of zero or about 0.

Depending upon the operating temperatures and the choice of the working fluid, a heat pump using the working fluid may have a Carnot efficiency in the range from about 0.3 to about 0.7. Alternatively, from about 0.3 to about 0.4, about 0.4 to about 0.5, about 0.5 to about 0.7, or any ranges therebetween.

The working fluid of the present disclosure may allow for a temperature difference between a heat source and a heat sink from about 40° C. to about 95° C., or any ranges therebetween.

The working fluid may comprise (Z)-1,1,1,4,4,4-hexafluoro-2-methyl-but-2-ene, having the formula as follows.

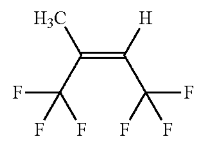

The working fluid may comprise 1,1,4,4-tetrafluoro-2-(difluoromethyl)-but-2-ene, having the formula as follows.

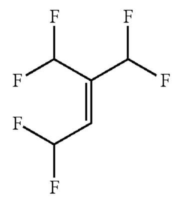 [SMILES: FC(F)C=C(C(F)F)C(F)F]

The working fluid may comprise 1,1,1,4,4,4-hexafluoro-2-(trifluoromethyl)-but-2-ene, having the formula as follows.

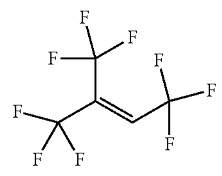 [SMILES: FC(F)(F)C=C(C(F)(F)F)C(F)(F)F]

The working fluid may comprise (Z)-1,1,1,4,4,4-hexafluoro-but-2-ene, having the formula as follows.

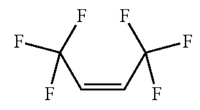

The working fluid may comprise (E)-1,1,1,2,4,4,4-heptafluoro-3-methyl-but-2-ene, (HFO E, cis), having the formula as follows.

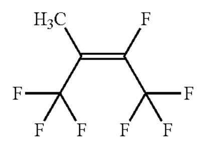

The working fluid may comprise (Z)-1,1,1,2,4,4,4-heptafluoro-3-methyl-but-2-ene, (HFO F, trans), having the formula as follows.

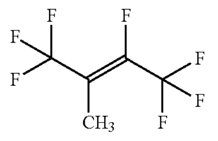

The working fluid may comprise (E)-1,1,1,3,5,5,5-heptafluoropent-2-ene, (HFO G, cis), having the formula as follows.

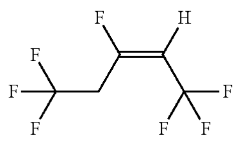 [SMILES: F/C(=C/C(F)(F)F)CC(F)(F)F]

The working fluid may comprise (Z)-1,1,1,3,5,5,5-heptafluoro-pent-2-ene, (HFO H, trans), having the formula as follows.

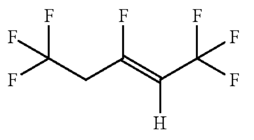 [SMILES: F/C(=C\C(F)(F)F)CC(F)(F)F]

The working fluid may comprise (E)-1,1,1,4,4,4-hexafluoro-2-methyl-but-2-ene (HFO I, trans), having the formula as follows.

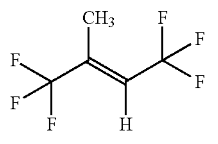

The working fluid may comprise 2-methyl-but-2-ene, having the formula as follows.

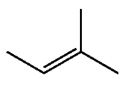

The working fluid may comprise 2,3-dimethyl-but-2-ene, having the formula as follows.

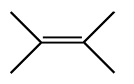

The working fluid may comprise 1,1,1,4,4,4-hexafluoro-2,3-dimethyl-but-2-ene, having the formula as follows.

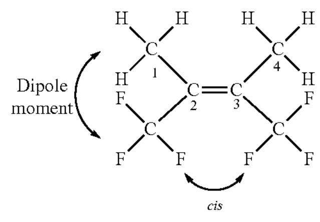 [SMILES: C/C(=C(\C)C(F)(F)F)C(F)(F)F]

1,1,1,4,4,4-hexafluoro-2,3-dimethyl-but-2-ene possesses 2 dipole moment structures and therefore has a strong polarity and is sterically hindered on both sides of the double bond.

Table 3 shows various high temperature heat pump cycle configurations including 1-stage and 2-stage high temperature heat pumps with various ejector, economizer, flash, evaporator, condenser, and internal heat exchanger (IHX) configurations. The working fluid of the present disclosure may be used in these and other vapor-compression cycle configurations.

TABLE 3

Example High-Temperature Heat Pump Cycle Configurations

| Ref. No. | Number of Stages | Modification |
|---|---|---|
| 1 | One-stage | IHX |
| 2 | One-stage | IHX, Ejector |
| 3 | One-stage | IHX, Economizer, Parallel Compression |
| 4 | Two-stage | At least two IHX |
| 5 | Two-stage | IHX, Economizer |
| 6 | Two-stage | IHX, Flash Chamber |
| 7 | Two-stage | IHX, Booster |

FIG. 1 illustrates a heat pump cycle 100 in accordance with examples of the present disclosure. As illustrated, heat pump cycle 100 may comprise compressor 102, condenser 104, expansion valve 106, and evaporator 108. Heat pump cycle 100 may be subcritical or transcritical. The working fluid may be conveyed to compressor 102 and to condenser 104, to expansion valve 106 and to evaporator 108, and back to compressor 102. The working fluid used in the example of FIG. 1 may be any of the working fluids described herein.

Figure 2:
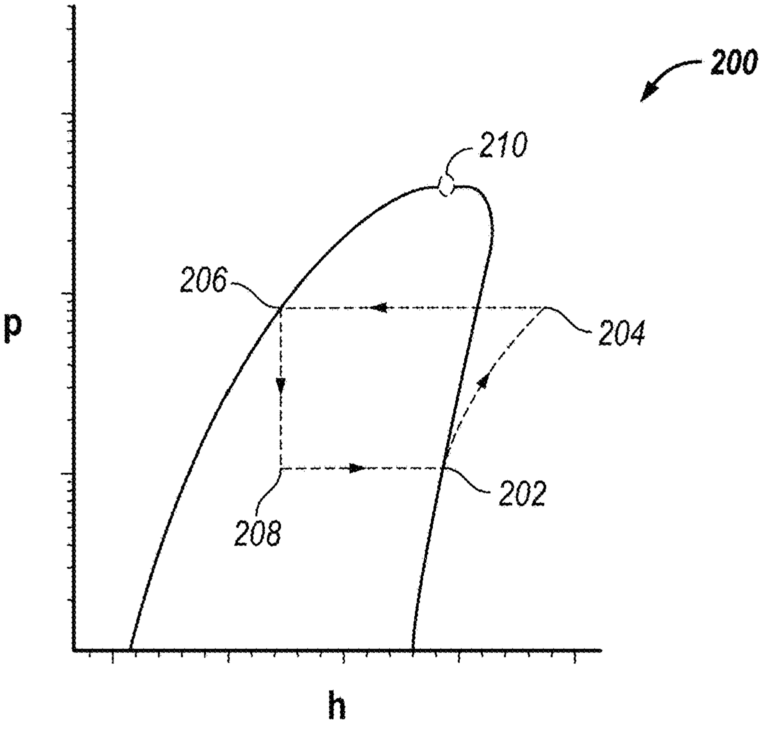
FIG. 2 is a pressure enthalpy diagram for a subcritical heat pump cycle in accordance with examples of the present disclosure.

FIG. 2 is a pressure enthalpy diagram for a subcritical heat pump cycle 200. A working fluid may have a phase envelope having a critical point 210. Compressor 102 (e.g., referring to FIG. 1) may compress the working fluid at state 202 to form working fluid at superheated vapor state 204. From superheated vapor state 204, condenser may condense the working fluid to form the saturated liquid at state 206. Condensation occurs below the critical point 210. Output heat 120 may be generated during condensation. From state 206, expansion valve 106 (e.g., referring to FIG. 1) may expand the working fluid to form the vapor-liquid 2-phase mixture at state 208. From state 208, evaporator 108 (e.g., referring to FIG. 1) may evaporate the working fluid to form the saturated vapor at state 202. Evaporation is endothermic and requires input heat 118. The working fluid used in the example of FIG. 2 may be any of the working fluids described herein.

Figure 3:
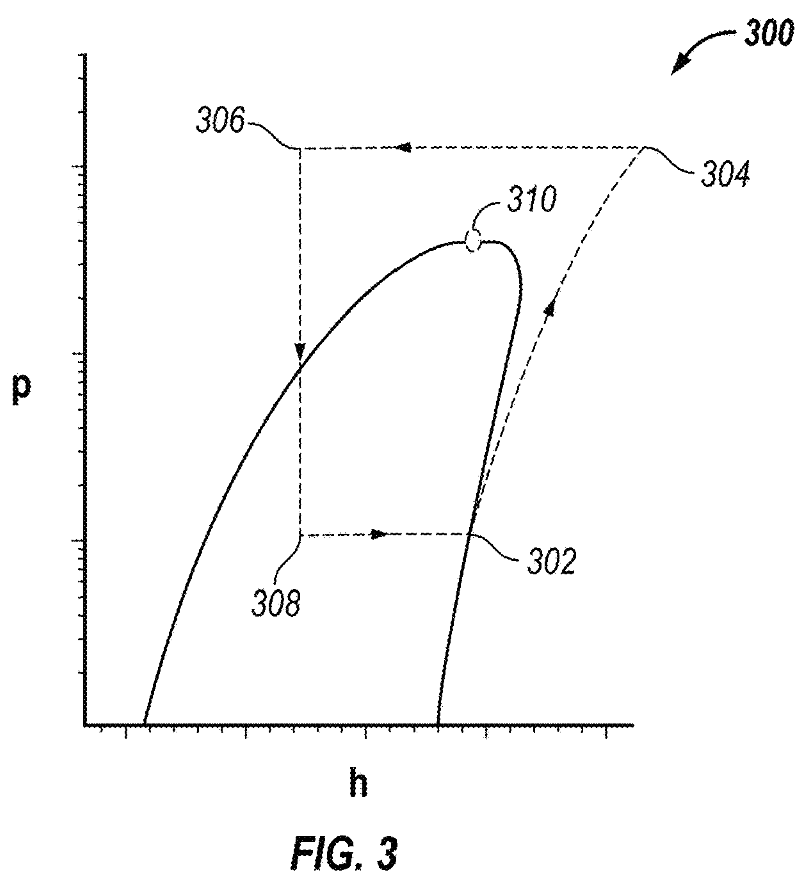
FIG. 3 is a pressure enthalpy diagram for a transcritical heat pump cycle in accordance with examples of the present disclosure.

FIG. 3 is a pressure enthalpy diagram for a transcritical heat pump cycle 300. A working fluid may have a phase envelop having a critical point 310. Compressor 102 (e.g., referring to FIG. 1) may compress the working fluid at saturated vapor 302 to form a supercritical fluid at state 304. From state 304, condenser may condense the supercritical fluid to form liquid state 306. "Condensation" above the critical point 310 is a graduate process that does not involve a phase change. Output heat 120 (e.g., referring to FIG. 1) is generated during condensation. From state 306, expansion valve 106 (e.g., referring to FIG. 1) may expand the working fluid to form a vapor-liquid 2-phase mixture at state 308. From state 308, evaporator 108 (e.g., referring to FIG. 1) evaporates the working fluid to form the saturated vapor at state 302. Evaporation is endothermic and requires input heat 118 (e.g., referring to FIG. 1). The working fluid used in the example of FIG. 3 may be any of the working fluids described herein.

Figure 4:
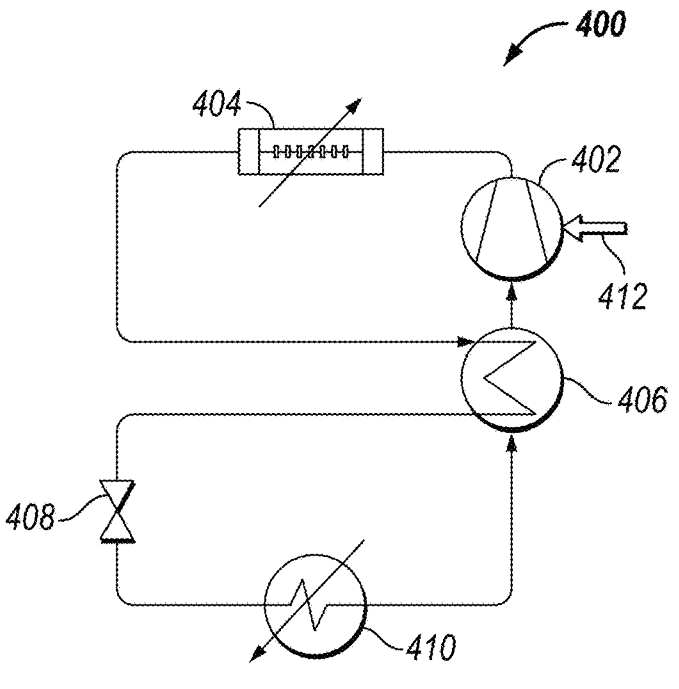
FIG. 4 illustrates a single stage transcritical heat pump with an internal heat exchanger in accordance with examples of the present disclosure.

FIG. 4 illustrates a single stage transcritical heat pump cycle 400 having an internal heat exchanger 406. As illustrated, single stage transcritical heat pump cycle 400 may comprise compressor 402, gas cooler 404, internal heat exchanger 406, expansion valve 408, and evaporator 410. The working fluid may be conveyed to compressor 402 and to gas cooler 404, to internal heat exchanger 406 and to expansion valve 408, to evaporator 410 and to compressor 402. Compression of the working fluid in compressor 402 requires input energy 412. The working fluid used in the example of FIG. 4 may be any of the working fluids described herein.

Figure 5:
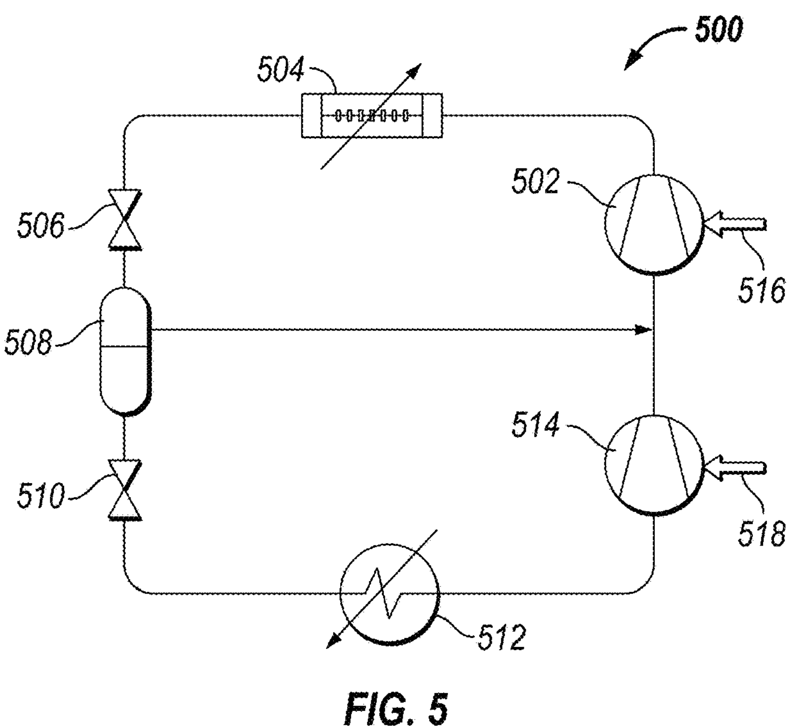
FIG. 5 illustrates a two-compression-stage transcritical heat pump with a flash cooler in accordance with examples of the present disclosure.

FIG. 5 illustrates a two-compression-stage transcritical heat pump cycle 500 with flash cooler 508. As illustrated, two-compression-stage transcritical heat pump cycle 500 may comprise first compressor 502, gas cooler 504, first expansion valve 506, flash cooler 508, second expansion valve 510, evaporator 512, and second compressor 514. The working fluid may be conveyed to first compressor 502 and to gas cooler 504, to expansion valve 506 and to flash cooler 508. The working fluid may be split into two separate portions at flash cooler 508 with one portion being conveyed back to compressor 502 and another portion being conveyed to expansion valve 510. The working fluid may be conveyed to evaporator 512 and to second compressor 514. The working fluid may be conveyed back to first compressor 501. Compression in compressors 502 and 514 may require input energy 516 and 518. The working fluid used in the example of FIG. 5 may be any of the working fluids described herein.

Figure 6:
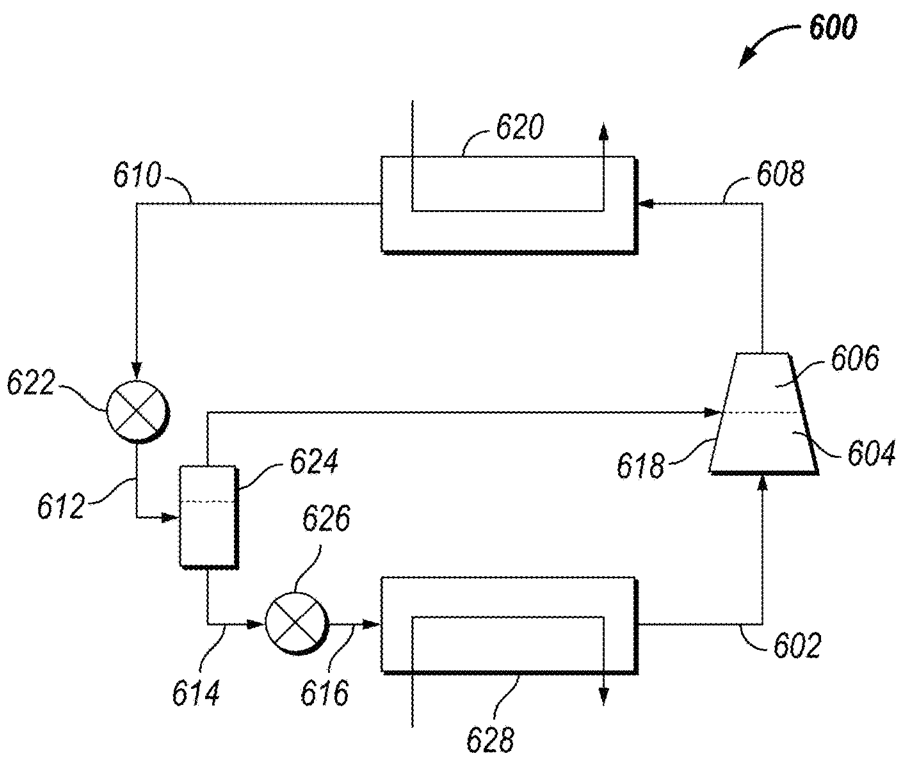
FIG. 6 illustrates a two-stage vapor compression cycle with a flash economizer in accordance with examples of the present disclosure.

FIG. 6 illustrates two-stage vapor compression cycle 600 with flash economizer 624. As illustrated, two stage vapor compression cycle 600 may comprise compressor 618, condenser 620, first expansion valve 622, flash economizer 624, second expansion valve 626, and evaporator 628. The working fluid may be conveyed to compressor 618 and to condenser 620, to first expansion valve 622 and to flash economizer 624. At flash economizer 624, the working fluid may be split into two portions with one portion being conveyed back to compressor 618 and another portion being conveyed to second expansion valve 626. The working fluid may be conveyed to condenser 628 and back to compressor 618. The working fluid used in the example of FIG. 6 may be any of the working fluids described herein.

Figure 7:
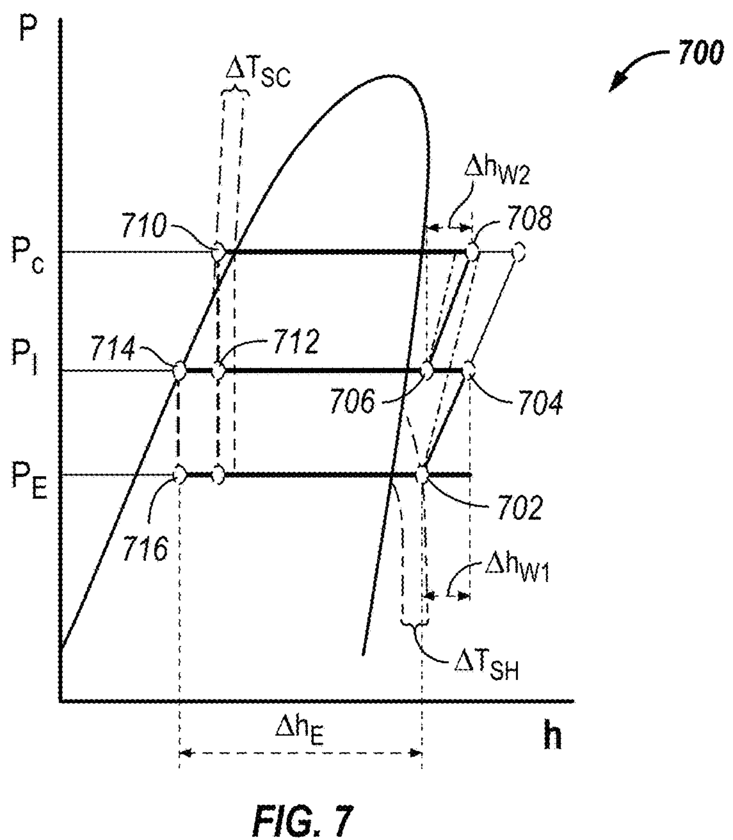
FIG. 7 is a pressure enthalpy diagram for a two-stage vapor compression cycle with a flash economizer in accordance with examples of the present disclosure.

FIG. 7 is a pressure enthalpy diagram 700 for a two-stage vapor compression cycle 600 with flash economizer 624 (e.g., referring to FIG. 6). As illustrated the working fluid may undergo compression from state 702 to state 704 and from state 706 to 708. The working fluid at state 708 may undergo isobaric condensation in condenser 720 to form the working fluid at state 710. The working fluid at states 710 and 712 may undergo expansion in first expansion valve 722 and second expansion valve 726 respectively. The working fluid at state 716 may be evaporated by evaporator 728 and conveyed back to compressor 718. The working fluid used in the example of FIG. 7 may be any of the working fluids described herein.

Figure 8:
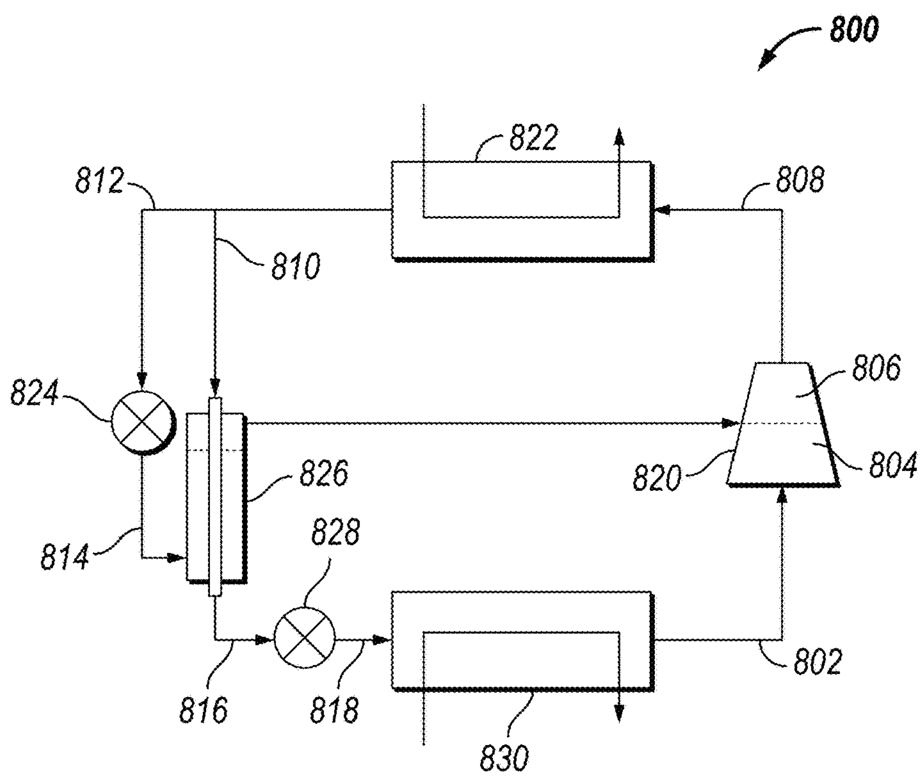
FIG. 8 illustrates a two-stage vapor compression cycle with a subcooler economizer in accordance with examples of the present disclosure.

FIG. 7 illustrates two-stage vapor compression cycle 800 with subcooler economizer 826. As illustrated, two stage vapor compression cycle 800 may comprise compressor 820, condenser 822, first expansion valve 824, subcooler economizer 826, second expansion valve 828, and evaporator 830. The working fluid may be conveyed to compressor 820 and to condenser 822, to first expansion valve 824 and to subcooler economizer 826. At subcooler economizer 826, the working fluid may be split into two portions with one portion being conveyed back to compressor 820 and another portion being conveyed to second expansion valve 828. The working fluid may be conveyed to condenser 830 and back to compressor 820. The working fluid used in the example of FIG. 8 may be any of the working fluids described herein.

Figure 9:
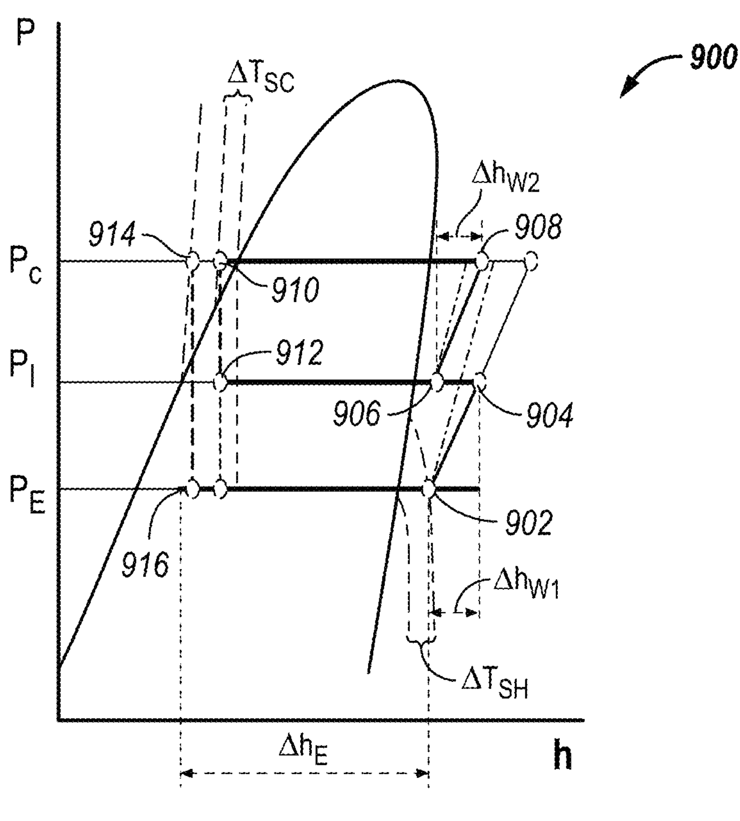
FIG. 9 is a pressure enthalpy diagram for a two-stage vapor compression cycle with a subcooler economizer in accordance with examples of the present disclosure.

FIG. 9 is a pressure enthalpy diagram for a two-stage vapor compression cycle with a subcooler economizer 826. As illustrated the working fluid may undergo compression from state 902 to state 904 and from state 906 to 908. The working fluid at state 908 may undergo isobaric condensation in condenser 822 to form the working fluid at state 910. The working fluid at state 910 may be divided into two portions, with the first portion being conveyed to first expansion valve 824 and a second portion being conveyed to subcooler economizer 826. The working fluid at state 910 may undergo expansion in first expansion valve 824 to form the working fluid at state 914 and then be fed to the subcooler economizer 826. The working fluid at state 916 may be further expanded to state 918 and evaporated by evaporator 830 and conveyed back to compressor 820. The working fluid used in the example of FIG. 9 may be any of the working fluids described herein.

Figure 10:
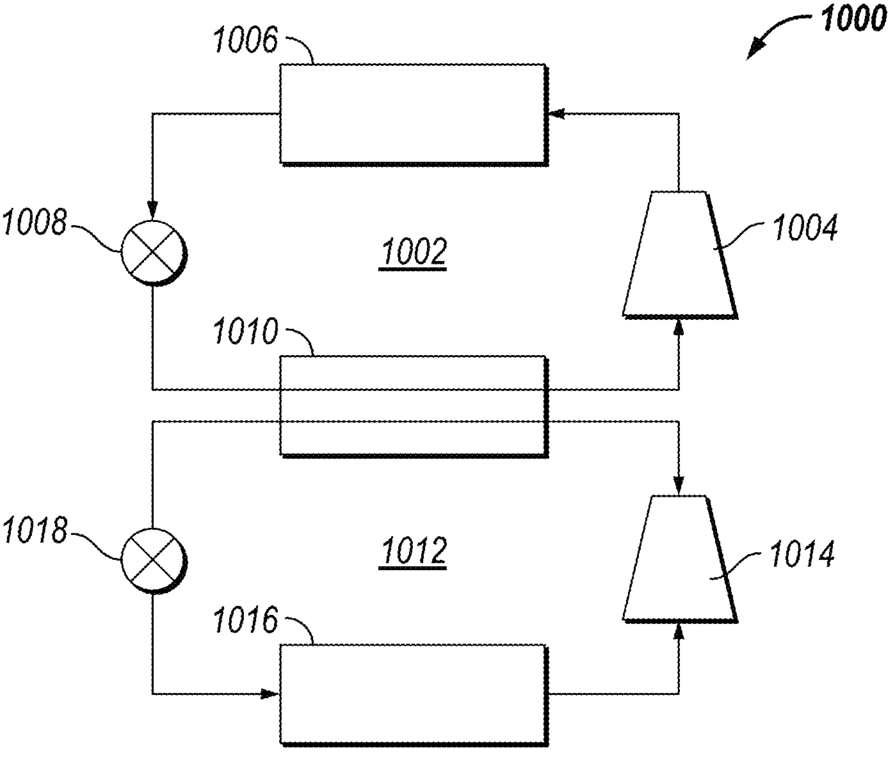
FIG. 10 illustrates a cascade system in accordance with examples of the present disclosure.

FIG. 10 is a cascade system 1000. Cascade system 1000 may comprise first compressor 1004, condenser 1006, first expansion valve 1008, heat exchanger 1010, second compressor 1014, second expansion valve 1018, and evaporator 1016. Cascade system 1000 may generally comprise two cycles being performed simultaneously: high temperature compound cycle 1002 and low temperature compound cycle 1012. Working fluid cycled through high temperature compound cycle 1002 may comprise a first working fluid comprising a compound or blend, and working fluid cycled through low temperature compound cycle 1012 may comprise a second working fluid comprising a compound or blend. The working fluid used in the example of FIG. 10 may be any of the working fluids described herein.

Figure 11:
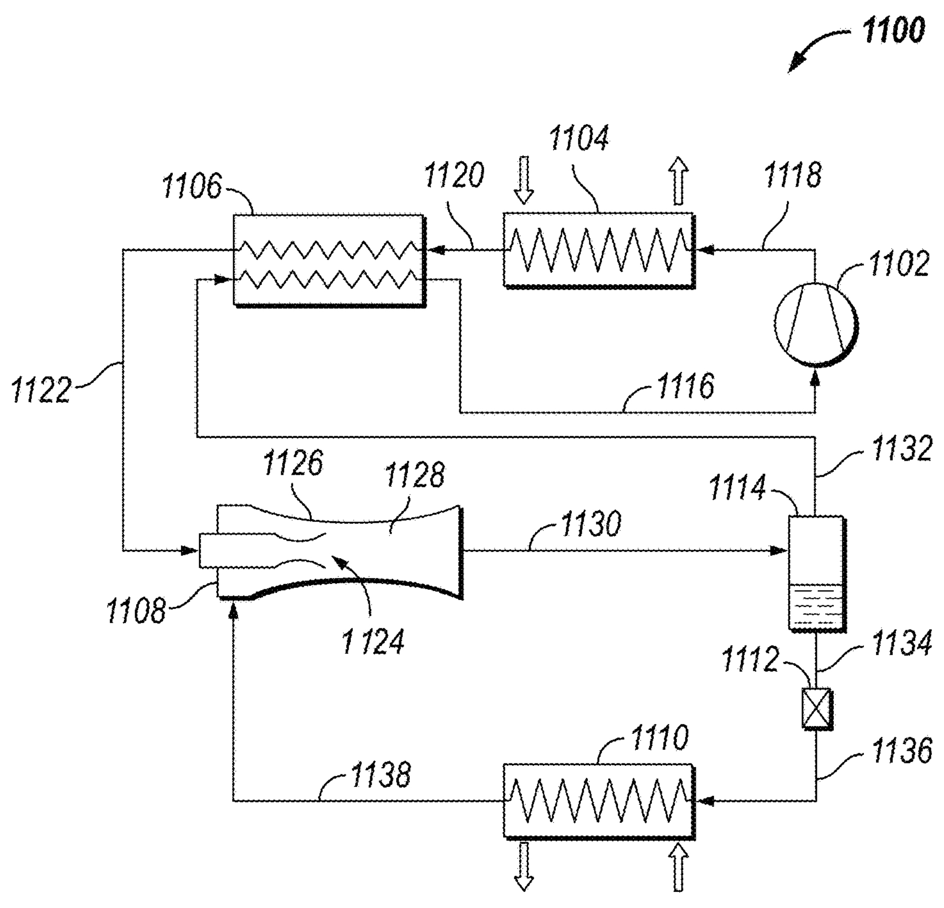
FIG. 11 illustrates a two-stage vapor compression cycle with an internal heat exchanger and a flash chamber in accordance with examples of the present disclosure.

FIG. 11 illustrates a two-stage vapor compression cycle 1100 with internal heat exchanger 1106 and flash chamber 1114. As illustrated, two-stage vapor compression cycle 1100 may comprise compressor 1102, condenser 1104, internal heat exchanger 1106, ejector 1108, evaporator 1110, expansion valve 1112, and flash chamber 1114. The working fluid at state 1116 may undergo compression in compressor 1102. The working fluid at state 1118 may be condensed in condenser 1104. The working fluid at state 1120 may be cooled by internal heat exchanger 1106. The working fluid may be conveyed to an ejector 1108 where it may undergo motive flow, suction flow, flow mixing, and flow diffusing. Ejector 1108 may comprise a motive flow inlet, a motive nozzle, a suction flow inlet, a mixing chamber, and a diffuser. From ejector 1108, the working fluid may be conveyed to flash chamber 1114, where the working fluid may be separated into two portions. The two portions may comprise two separate phases (e.g., liquid and vapor). The first portion of working fluid at state 1132 may be conveyed to internal heat exchanger 1106 where it may undergo an increase in temperature. After passing through internal heat exchanger 1106, working fluid at state 1116 may be conveyed back to compressor 1102. The second portion of working fluid at state 1134 may be conveyed to expansion valve 1112 where it may undergo expansion to form the working fluid at state 1136. The working fluid at state 1136 may be conveyed to evaporator 1110 where it may undergo evaporation to form working fluid at state 1138. The working fluid at state 938 may be conveyed to ejector 908, where it may undergo suction flow at a suction flow inlet of ejector 1108 and mix with the working fluid at state 1122 introduced through a motive flow inlet of ejector 1108. The working fluid used in the example of FIG. 11 may be any of the working fluids described herein.

Figure 12:
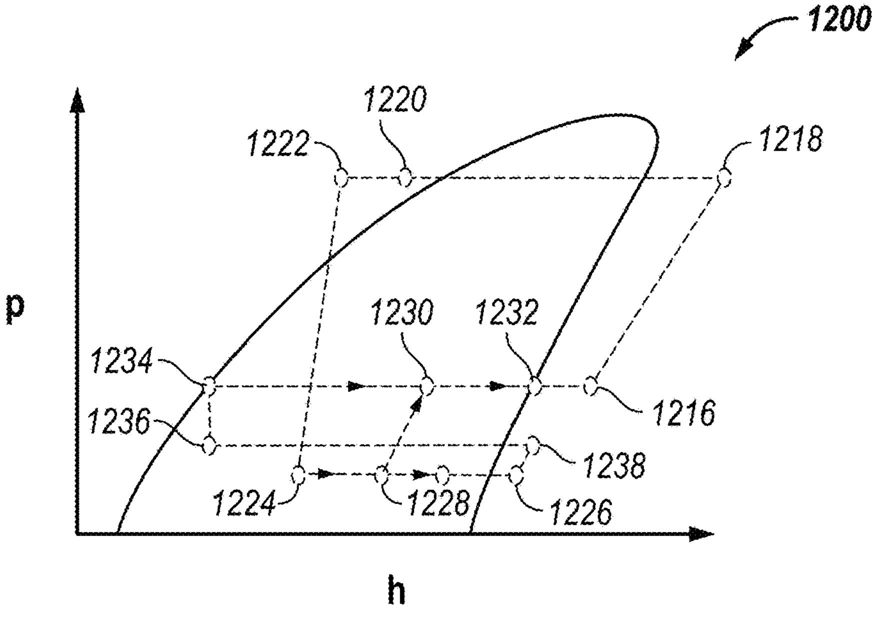
FIG. 12 is a pressure enthalpy diagram for a two-stage vapor compression cycle with an internal heat exchanger and a flash chamber in accordance with examples of the present disclosure.

FIG. 12 is a pressure enthalpy diagram 1200 for a two-stage vapor compression cycle 1100 with internal heat exchanger 1106 and flash chamber 1114. As illustrated, the working fluid may undergo compression from state 1116 to state 1118, cooling from state 1118 to 1120, further cooling from state 1120 to 1122, expansion from state 1122 to 1124, increase in enthalpy from state 1124 to state 1128 and state 1130, expansion from state 1134 to state 1136, and evaporation from state 1136 to state 1138. The working fluid used in the example of FIG. 12 may be any of the working fluids described herein.

Figure 13:
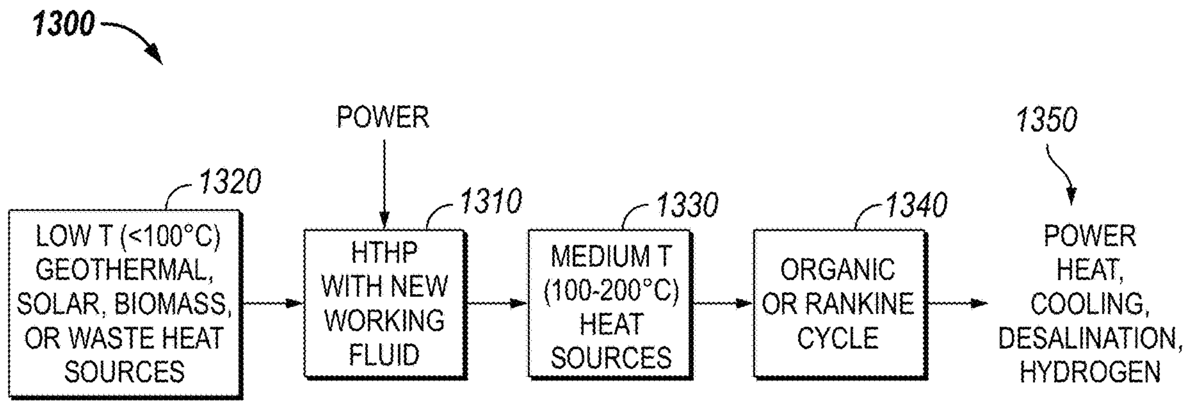
FIG. 13 is a schematic of a method of upgrading low temperature waste heat for use in power co-gen, tri-gen, or polygeneration in accordance with example embodiments of the present disclosure.

FIG. 13 is a flowchart 1300 of one embodiments of the present disclosure wherein a working fluid of the high temperature heat pump 1310 is used to recover heat 1320 from a low temperature source (<100° C.), such as a geothermal well, solar thermal heat, biomass, water heat source, or any waste heat from any industrial process. The recovered heat 1320 is then transmitted to a medium temperature (from about 100° C. to about 200° C.) heat source 1330 through a heat exchanger. Heat source 1330 is then used in an Organic Rankine Cycle (ORC) or a Steam Rankine cycle (SRC) 1340 to be converted into electrical energy to power electrical equipment 1350, such as heater, cooler, a desalination system, or to produce green hydrogen. The working fluid used in the example of FIG. 13 may be any of the working fluids described herein.

Figure 14:
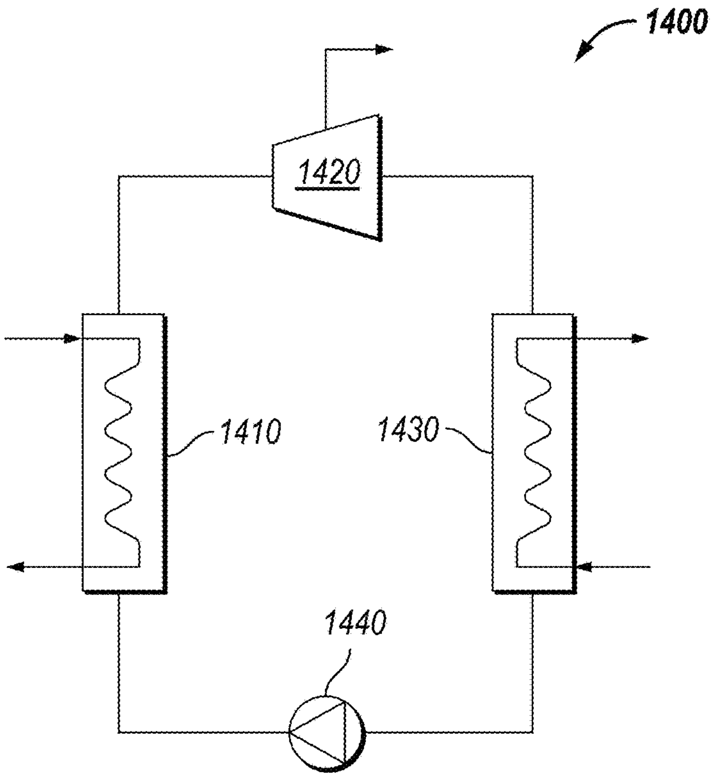
FIG. 14 is a schematic of an organic Rankine cycle using an organic working fluid through a turbine to generate electricity in accordance with example embodiments of the present disclosure.

FIG. 14 is a schematic of a working Organic Rankine Cycle (ORC) unit 1400 converting a low temperature heat resource into electrical power according to embodiments of the present disclosure. The Organic Rankine Cycle is similar to the Steam Rankine Cycle (SRC). However, the Organic Rankine Cycle unit 1400 uses an evaporator 1410 to use the thermal energy from a heat source to convert the selected refrigerant of the present disclosure instead of water to steam, which expands through a turbine 1420 in order to generate electricity and low-pressure vapor. The working fluid of the present disclosure may include a blend of $C_5$ and/or $C_6$ hydrofluoroolefins (HFOs) and $C_5$ and/or $C_6$ cis olefin. The low-pressure vapor is then directed to a condenser 1430 to be cooled. The cooled water is then sent as a low-pressure liquid to a pump 1440 to be compressed to high pressure and directed to evaporator 1410 and the cycle starts again. The working fluid used in the example of FIG. 14 may be any of the working fluids described herein.

Figure 15:
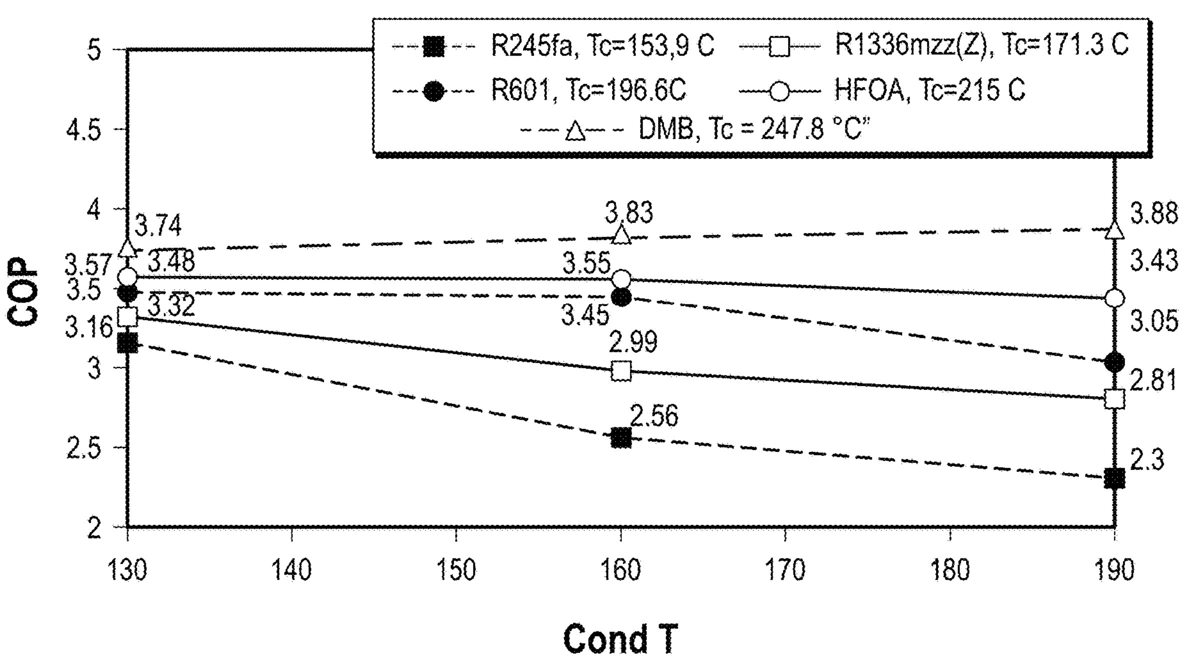
FIG. 15 is a plot of several coefficient of performances (COP) versus condenser temperature (high temperature output) for various high temperature heat pump (HTHP) refrigerants in accordance with example embodiments of the present disclosure.

FIG. 15 is a plot of the coefficient of performance (COP) calculated by an Aspen Plus® model as a function of condenser temperature for various high temperature heat pump (HTHP) working fluids. Five working fluids were tested including R245fa, R1336mzz(Z), R601, HFOA, and DMB. R245fa is 1,1,1,3,3-pentafluoropropane, which has a critical temperature of 153.9° C. R1336mzz(Z) is cis-1,1,1,4,4,4-hexafluoro-but-2-ene, which has a critical temperature of 171.3° C. R601 is n-pentane, which has a critical temperature of 196.6° C. HFOA is 1,1,1,4,4,4-hexafluoro-2-methyl-but-2-ene, which has a critical temperature of 215° C. DMB is 2,3-dimethyl-but-2-ene, which has a critical temperature of 247.8° C. The coefficient of performance is calculated by dividing the heat removed from the system by the net work the compressor used to remove the heat. The working fluid used in the example of FIG. 15 may be any of the working fluids described herein.

Working fluids having a critical temperature relatively close to the temperature of the heat source should reach the highest cycle efficiency. The $C_5$ and $C_6$ hydrofluoroolefins and $C_5$ and $C_6$ cis-olefin have critical temperatures close to the temperature of the heat source. In FIG. 11*a*, DMB or 2,3-dimethyl-but-2-ene displays the highest coefficient of performance, followed by HFOA or 1,1,1,4,4,4-hexafluoro-2-methyl-but-2-ene, R601 or n-pentane, R1336mzz(Z) or cis-1,1,1,4,4,4-hexafluoro-but-2-ene, and R245fa or 1,1,1,3,3-pentafluoropropane.

Figure 16:
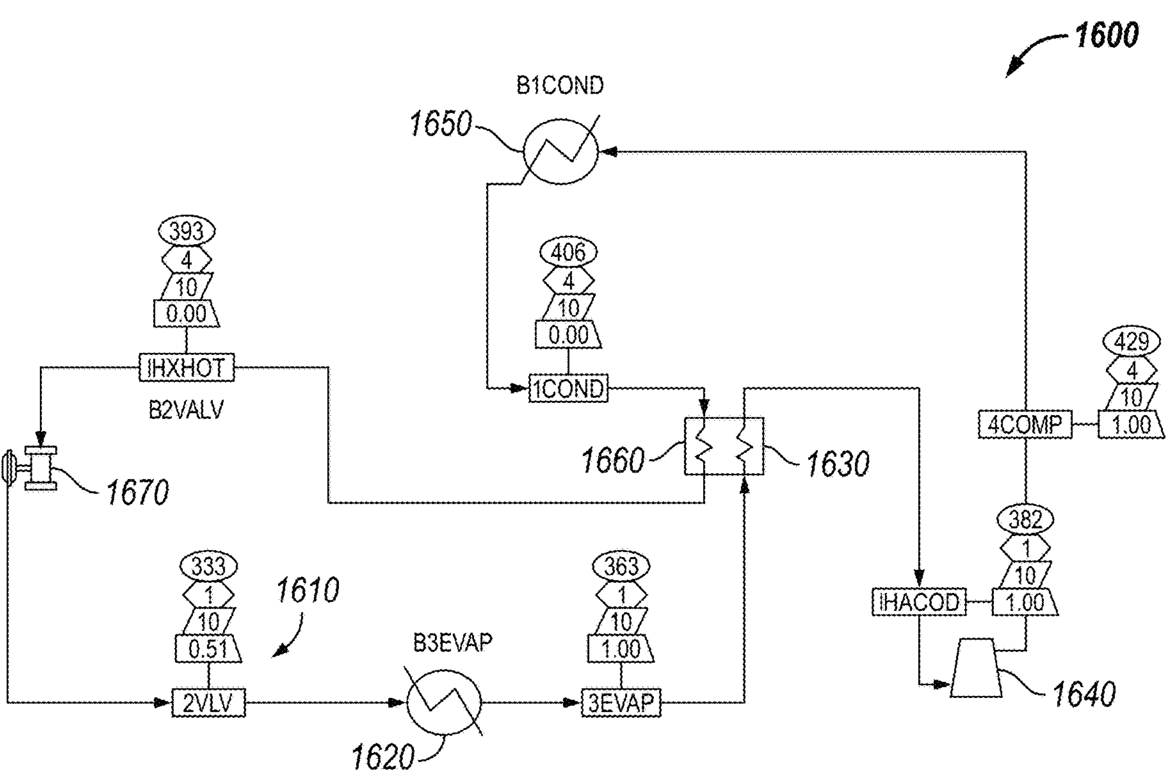
FIG. 16 is a process flowsheet for modeling of a high temperature heat pump (HTHP) cycle with an internal heat exchanger (IHX) in accordance with example embodiments of the present disclosure.

The process flowsheet 1600 used for the Aspen Plus® modeling with the high pressure heat pump with an internal heat exchanger (IHX) of FIG. 15 is illustrated in FIG. 16. One of the 5 working fluids of FIG. 16 leaves the expansion valve 1610 and enters the evaporator 1620 as a vapor/liquid mixture 2VLV. The vapor/liquid mixture 2VLV absorbs the waste heat and leaves evaporator 1620 as a saturated vapor or a superheated vapor 3EVAP, then it passes through an internal heat exchanger 1630 to become superheated or even more superheated IHXCOD (the cold side stream). It is then compressed in compressor 1640 with external work input to become a hot, superheated vapor 4COMP. The superheated vapor 4COMP is then condensed in condensator 1650 to saturated liquid 1COND and release the upgraded heat at the high temperature level. The hot saturated liquid is used to warm up the incoming cold vapor 3EVAP at heat exchanger 1660 and exits as IHXHOT (the hot side stream), then enters the expansion valve (the Joule-Thomson effect) 1670 to exit as a cold 2-phase mixture 2VLV. The working fluid used in the example of FIG. 16 may be any of the working fluids described herein.

Although specific examples have been described above, these examples are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but examples may provide some, all, or none of such advantages, or may provide other advantages.

What is claimed is:

1. A method comprising:

compressing a working fluid to form a compressed working fluid, wherein the working fluid comprises:

at least one $C_5$ or $C_6$ cis or (Z) hydrofluoroolefins; and at least one $C_5$ or $C_6$ cis olefins wherein the at least one $C_5$ or $C_6$ cis or (Z) hydrofluoroolefins and the at least one $C_5$ or $C_6$ cis olefins working fluid comprise (Z)-1,1,1,4,4,4-hexafluoro-2-methylbut-2-ene and 2,3-dimethyl-but-2-ene in a ratio of about 8:5 to 12:5 or in a ratio of about 7:1 to 11:1 or in a ratio of about 6:5 to 4:5;

condensing the working fluid to form a condensed working fluid, expanding the working fluid to form an expanded working fluid; and heating the working fluid, wherein heat from a heat source is transferred to a heat sink with the working fluid.

2. The method of claim 1, wherein the at least one $C_5$ or $C_6$ cis or (Z) hydrofluoroolefins is selected from the group consisting of: 2,3-dimethyl-but-2-ene, (Z)-1,1,1,4,4,4-hexafluoro-2-methylbut-2-ene, 2-(difluoromethyl)-1,1,4,4-tetrafluorobut-2-ene, 1,1,1,4,4,4-hexafluoro-2-(trifluoromethyl)-2-butene, (Z)-1,1,1,4,4,4-hexafluoro-2-butene, (E)-1,1,1,2,4,4,4-heptafluoro-3-methylbut-2-ene, (Z)-1,1,1,2,4,4,4-heptafluoro-3-methylbut-2-ene, (E)-1,1,1,3,5,5,5-heptafluoro-2-pentene, (Z)-1,1,1,3,5,5,5-heptafluoro-2-pentene, (E)-1,1,1,4,4,4-hexafluoro-2-methylbut-2-ene, and any combinations thereof.

3. The method of claim 1, wherein the at least one $C_5$ or $C_6$ cis or (Z) hydrofluoroolefins and the at least one $C_5$ or $C_6$ cis olefins working fluid comprise (Z)-1,1,1,4,4,4-hexafluoro-2-methylbut-2-ene and 2,3-dimethyl-but-2-ene in a ratio of about 8:5 to 12:5.

4. The method of claim 1, wherein the at least one $C_5$ or $C_6$ cis or (Z) hydrofluoroolefins and the at least one $C_5$ or $C_6$ cis olefins comprise (Z)-1,1,1,4,4,4-hexafluoro-but-2-ene and 2-methyl-but-2-ene in a ratio of about 7:1 to 11:1.

5. The method of claim 1, wherein the at least one $C_5$ or $C_6$ cis or (Z) hydrofluoroolefins and the at least one $C_5$ or $C_6$ cis olefins comprise (Z)-1,1,1,4,4,4-hexafluoro-but-2-ene and 2,3-dimethyl-but-2-ene in a ratio of about 7:1 to 11:1.

6. The method of claim 1, wherein the working fluid after the compressing is in a supercritical phase.

7. The method of claim 1, wherein a compressed working fluid is in a subcritical phase.

8. The method of claim 1, further comprising flowing the working fluid through at least one device selected from the group consisting of: an evaporator; a flash cooler, a flash economizer, a heat exchanger, and any combination thereof.

9. The method of claim 1, further comprising flowing the working fluid and an additional working fluid through a heat exchanger, wherein heat is transferred between the working fluid and the additional working fluid.

10. The method of claim 1, wherein the working fluid has a critical temperature greater than 170° C.

11. The method of claim 1, wherein the working fluid has a critical pressure less than 35 bar.

12. A method comprising:

compressing a working fluid to form a compressed working fluid, wherein the working fluid comprises:

at least one $C_5$ or $C_6$ cis or (Z) hydrofluoroolefins; and at least one $C_5$ or $C_6$ cis olefins, wherein the at least one $C_5$ or $C_6$ cis or (Z) hydrofluoroolefins and the at least one $C_5$ or $C_6$ cis olefins comprise (Z)-1,1,1,4,4,4-hexafluoro-but-2-ene and 2-methyl-but-2-ene in a ratio of about 7:1 to 11:1 or in a ratio of about 6:5 to 4:5;

condensing the working fluid to form a condensed working fluid, expanding the working fluid to form an expanded working fluid; and heating the working fluid, wherein heat from a heat source is transferred to a heat sink with the working fluid.

13. The method of claim 12, wherein the at least one $C_5$ or $C_6$ cis or (Z) hydrofluoroolefins and the at least one $C_5$ or $C_6$ cis olefins comprise (Z)-1.1.1.4.4.4-hexafluoro-but-2-ene and 2-methyl-but-2-ene in a ratio of about 7:1 to 11.1.

14. The method of claim 12, wherein the at least one $C_5$ or $C_6$ cis or (Z) hydrofluoroolefinsil and the at least one $C_5$ or $C_6$ cis olefins comprise (Z)-1,1,1,4,4,4-hexafluoro-but-2-ene and 2-methyl-but-2-ene in a ratio of about 6:5 to 4:5.

15. A method comprising:

compressing a working fluid to form a compressed working fluid, wherein the working fluid comprises:

at least one $C_5$ or $C_6$ cis or (Z) hydrofluoroolefins; and at least one $C_5$ or $C_6$ cis olefins, wherein the at least one $C_5$ or $C_6$ cis or (Z) hydrofluoroolefins and the at least one $C_5$ or $C_6$ cis olefins comprise 1,1,1,4,4,4-hexafluoro-2-(trifluoromethyl)-but-2-ene and 2-methyl-but-2-ene in a ratio of about 5:2 to 4:1 or in in a ratio of about 7:11 to 1:1;

condensing the working fluid to form a condensed working fluid, expanding the working fluid to form an expanded working fluid; and heating the working fluid, wherein heat from a heat source is transferred to a heat sink with the working fluid.

16. The method of claim 15, wherein the at least one $C_5$ or $C_6$ cis or (Z) hydrofluoroolefins and the at least one $C_5$ or $C_6$ cis olefins comprise 1,1,1,4,4,4-hexafluoro-2-(trifluoromethyl)-but-2-ene and 2-methyl-but-2-ene in a ratio of about 5:2 to 4:1.

17. The method of claim 15, wherein the at least one $C_5$ or $C_6$ cis or (Z) hydrofluoroolefins and the at least one $C_5$ or $C_6$ cis olefins comprise 1,1,1,4,4,4-hexafluoro-2-(trifluoromethyl)-but-2-ene and 2-methyl-but-2-ene in a ratio of about 7:11 to 1:1.

18. A method comprising:

compressing a working fluid to form a compressed working fluid, wherein the working fluid comprises:

at least one $C_5$ or $C_6$ cis or (Z) hydrofluoroolefins; and at least one $C_5$ or $C_6$ cis olefins, wherein the at least one $C_5$ or $C_6$ cis or (Z) hydrofluoroolefins and the at least one $C_5$ or $C_6$ cis olefins comprise 1,1,1,4,4,4-hexafluoro-2-(trifluoromethyl)-but-2-ene and 2,3-dimethyl-but-2-ene in a ratio of about 5:2 to 4:1 or in a ratio of about 7:11 to 1:1;

condensing the working fluid to form a condensed working fluid, expanding the working fluid to form an expanded working fluid; and heating the working fluid, wherein heat from a heat source is transferred to a heat sink with the working fluid.

19. The method of claim 18, wherein the at least one $C_5$ or $C_6$ cis or (Z) hydrofluoroolefinsil and the at least one $C_5$ or $C_6$ cis olefins comprise 1,1,1,4,4,4-hexafluoro-2-(trifluoromethyl)-but-2-ene and 2,3-dimethyl-but-2-ene in a ratio of about 5:2 to 4:1.

20. The method of claim 18, wherein the at least one $C_5$ or $C_6$ cis or (Z) hydrofluoroolefins and the at least one $C_5$ or $C_6$ cis olefins comprise 1,1,1,4,4,4-hexafluoro-2-(trifluoromethyl)-but-2-ene and 2,3-dimethyl-but-2-ene in a ratio of about 7:11 to 1:1.

* * * * *